United States Patent
Kim

(10) Patent No.: US 8,346,957 B2
(45) Date of Patent: Jan. 1, 2013

(54) METHOD AND APPARATUS FOR TRANSMITTING/RECEIVING INFORMATION IN INTERNET PROTOCOL NETWORK

(75) Inventor: Sun-bal Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 390 days.

(21) Appl. No.: 11/783,633

(22) Filed: Apr. 11, 2007

(65) Prior Publication Data

US 2008/0126477 A1    May 29, 2008

(30) Foreign Application Priority Data

Nov. 29, 2006    (KR) .................. 10-2006-0119135

(51) Int. Cl.
G06F 15/16    (2006.01)
(52) U.S. Cl. ................ 709/232; 709/204
(58) Field of Classification Search .............. None
See application file for complete search history.

(56) References Cited

U.S. PATENT DOCUMENTS

| | | | | |
|---|---|---|---|---|
| 6,385,647 | B1 * | 5/2002 | Willis et al. | 709/217 |
| 7,822,810 | B2 * | 10/2010 | Dayal et al. | 709/204 |
| 2002/0161829 | A1 | 10/2002 | Zee et al. | |
| 2002/0184311 | A1 | 12/2002 | Traversat et al. | |
| 2004/0158872 | A1 * | 8/2004 | Kobayashi | 725/120 |
| 2005/0193099 | A1 * | 9/2005 | Reus et al. | 709/220 |
| 2006/0171390 | A1 * | 8/2006 | La Joie | 370/390 |
| 2006/0190589 | A1 * | 8/2006 | Parker | 709/224 |
| 2008/0126477 | A1 * | 5/2008 | Kim | 709/203 |

FOREIGN PATENT DOCUMENTS

| | | |
|---|---|---|
| CN | 1816053 A | 8/2006 |
| KR | 20010073511 A | 6/2001 |
| KR | 20020023596 A | 3/2002 |
| KR | 10-0460938 B1 | 12/2004 |
| KR | 10-2006-0065239 A | 6/2006 |

OTHER PUBLICATIONS

Office Action dated Jun. 20, 2011 issued by the State Intellectual Property Office of P.R. China in counterpart Chinese Application No. 200710109187.9.
Communication dated Feb. 10, 2011 issued by the Korean Intellectual Property Office in counterpart Korean Patent Application No. 10-2006-0119135.
Notice of Allowance dated Sep. 9, 2011 issued by the Korean Intellectual Property Office in counterpart Korean Patent Application No. 10-2006-0119135.
Communication dated May 4, 2012 from the State Intellectual Property Office of P.R. China in a counterpart application No. 200710109187.9.

* cited by examiner

Primary Examiner — Brian P. Whipple
Assistant Examiner — Keyvan Emdadi
(74) Attorney, Agent, or Firm — Sughrue Mion, PLLC

(57) ABSTRACT

A method and apparatus are provided for transmitting and receiving information in an Internet Protocol (IP) network. In the method of allowing a client to receive information from a server, the client requests that a third client in a subnet to which the client belongs transmit the information, and receives the information that the third client transmits in response to the request. Accordingly, it is possible to quickly share information for a broadcast, which the server provides, while minimizing the load on the server.

27 Claims, 5 Drawing Sheets

METHOD AND APPARATUS FOR TRANSMITTING/RECEIVING INFORMATION IN INTERNET PROTOCOL NETWORK

CROSS-REFERENCE TO RELATED PATENT APPLICATIONS

This application claims priority from Korean Patent Application No. 10-2006-0119135, filed on Nov. 29, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to transmitting/receiving information in an Internet Protocol (IP) network, and more particularly, to allowing clients to transmit/receive information transmitted from a server.

2. Description of the Related Art

Internet Protocol Television (IPTV) is a service whereby an information service, a content service, or a broadcast service is provided to a television receiver by using the Internet. IPTV is a type of Internet Protocol (IP)-based service that is provided via the Internet infrastructure that has been built as demand for the Internet has increased.

FIG. 1 is a block diagram of a related art method of transmitting/receiving information in an IPTV network. Referring to FIG. 1, an IPTV server 10 has IPTV content and provides it to a first IPTV client 11 or a second IPTV client 12. The first or second IPTV client 11 or 12 is a device, such as an IPTV set top box, which requests that the IPTV server 10 provide a service and/or content or receives the service and/or content from the IPTV server 10.

Here, the IPTV server 10 transmits information regarding the service and/or content to IPTV clients via multicast, broadcast, or unicast. Information that must be transmitted to all IPTV clients is transmitted via multicast or broadcast, but information that must be transmitted to only a specific IPTV client is transmitted via unicast.

An IPTV client that has not received the information from the IPTV server 10 or that desires to receive the information from the IPTV server 10 via unicast, requests that the IPTV server 10 transmit the information and receives the information from the IPTV server 10 in response to the request.

In FIG. 1, each of the first and second IPTV clients 11 and 12 individually requests that the IPTV server 10 transmit information, and receives it from the IPTV server 10. Here, the information may include all information required for the first and second IPTV clients 11 and 12 to receive and use the service and/or content that the IPTV server 10 provides. For example, electronic program guide (EPG) information, electronic cinema guide (ECG) information, uniform resource locator (URL) information, and metadata information regarding the content that the IPTV server 10 holds, may be included in information exchanged among the IPTV server 10 and the IPTV clients 11 and 12. Information related to services provided by the IPTV server 10 (weather information, stock information, cultural information, etc.) may also be included in the information exchanged among the IPTV server 10 and the first and second IPTV clients 11 and 12.

When information is transmitted and received as illustrated in FIG. 1, the IPTV server 10 must make individual responses to requests from IPTV clients. Accordingly, when a large number of IPTV clients request the information at the same time, it may cause the IPTV server 10 to overload.

Also, when the first IPTV client 11 and the second IPTV client 12 are connected to the same router, thus forming a subnet, the above-described method is inefficient since the first IPTV client 11 and the second IPTV client 12 have to receive information from the IPTV server 10 although the first IPTV client 11 is adjacent to the second IPTV client 12 physically and temporally.

SUMMARY OF THE INVENTION

The present invention provides a method of efficiently transmitting/receiving information in an IP network while reducing the load on a server.

The present invention also provides a computer readable medium having recorded thereon a computer program for executing the above method.

According to an aspect of the present invention, there is provided a method of allowing a client to receive information from a server, the method comprising requesting that a third client in a subnet to which the client belongs transmit the information; and receiving the information that the third client transmits in response to the request.

The requesting of the information may comprise multicasting or broadcasting a request message, requesting transmission of the information, to clients in the subnet to which the client belongs.

The requesting of the information may comprise multicasting or broadcasting a request message, requesting transmission of the information, to clients in the subnet to which the client belongs; and when no response is made to the request message within a amount of time, re-multicasting or re-broadcasting the request message to clients in an upper subnet which includes the original subnet.

According to another aspect of the present invention, there is provided a method of allowing a client to share information received from a server, the method comprising receiving a request for the information from a third client in a subnet to which the client belongs; and transmitting the information to the third client in response to the request.

The receiving of the request may comprise receiving a request message requesting transmission of the information, where the third client multicasts or broadcasts the request message to the clients in the subnet.

The client and the server may be an IPTV client and an IPTV server, respectively. The information may comprise at least one of electronic program guide information and electronic cinema guide information regarding content that the IPTV server provides.

According to another aspect of the present invention, there is provided an apparatus which is included in a client so as to receive information from a server, the apparatus comprising an information requesting unit requesting that a third client in a subnet to which the client belongs transmit the information; and an information receiving unit receiving the information that the third client transmits in response to the request.

According to another aspect of the present invention, there is provide an apparatus which is included in a client so as to allow the client to share information received from a server, the apparatus comprising a request receiving unit receiving a request for transmission of the information from a third client in a subnet to which the client belongs; and an information transmitting unit transmitting the information to the third client in response to the request.

According to another aspect of the present invention, there is provided a computer readable medium having recorded thereon a computer program for executing the above methods.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Hereinafter, exemplary embodiments of the present invention will be described in detail with reference to the accompanying drawings.

In this disclosure, FIGS. 2 through 8 will be described with respect to an IPTV server and an IPTV client. However, the IPTV server and the IPTV client are just examples of a server and a client that transmit and receive information in an IP network. It would be apparent to those of ordinary skill in the art that the present invention can be applied to all types of servers and clients capable of transmitting and receiving information via the IP network.

Figure 1:
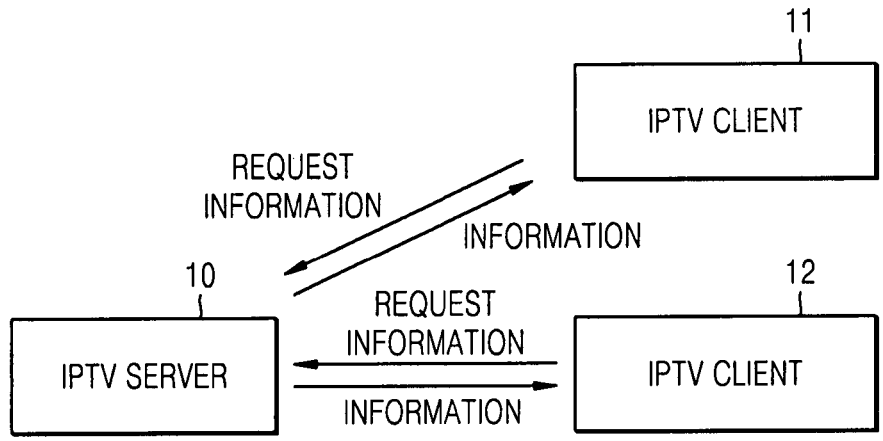
FIG. 1 is a block diagram illustrating a conventional method of transmitting and receiving information in an IPTV network.
Figure 2:
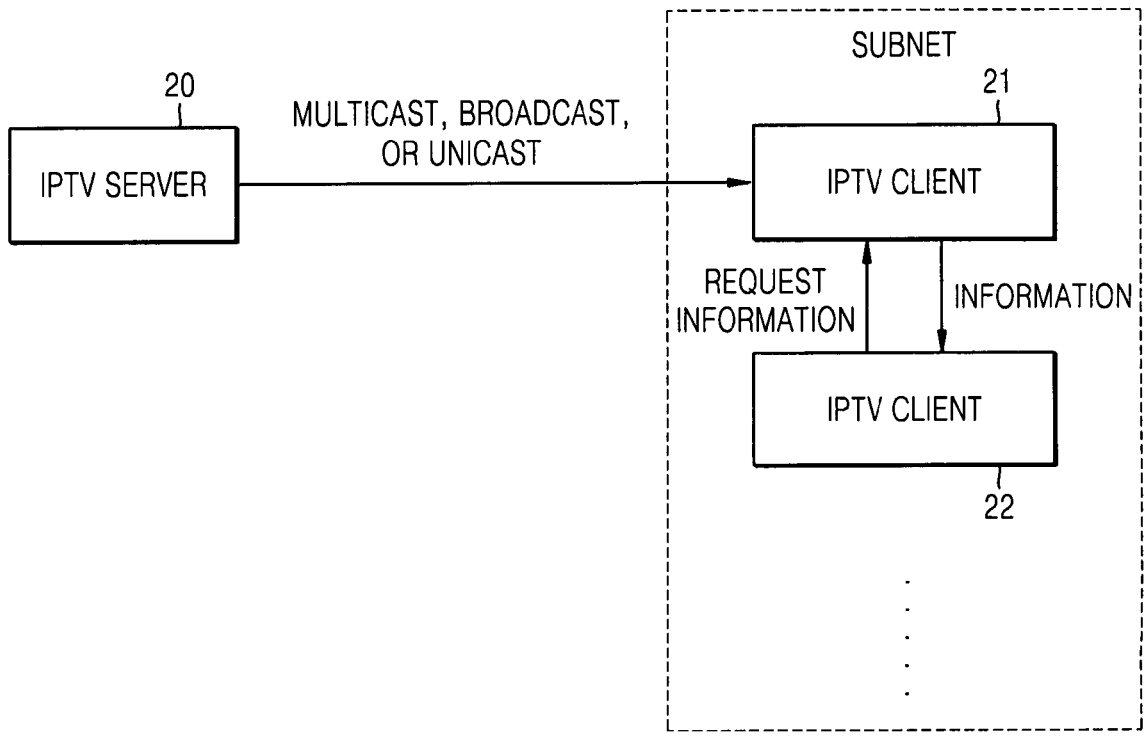
FIG. 2 is a block diagram illustrating a method of allowing an IPTV client to transmit and receive information according to an exemplary embodiment of the present invention.

FIG. 2 is a block diagram illustrating a method of allowing an IPTV client to transmit and receive information, according to an exemplary embodiment of the present invention. Referring to FIG. 2, an IPTV server 20 transmits information regarding a service and/or content to an IPTV client 21 via multicast, broadcast, or unicast.

The information regarding the content may include electronic program guide (EPG) information, electronic cinema guide (ECG) information, uniform resource locator (URL) information and metadata information regarding content that the IPTV server 20 has. The information regarding the service may include information related to services (weather information, stock information, cultural information, etc.) of the IPTV server 20.

The IPTV client 21 receiving the information shares the received information with another IPTV client, e.g., an IPTV client 22. The IPTV clients 21 and 22 belong to a subnet.

Here, the subnet means a local network that can be logically and physically identified. A criterion for identifying the subnet is not limited but a network managed by a router may be defined to be the subnet.

According to the present invention, another IPTV client, e.g., the IPTV client 22, which desires to receive the information that the IPTV server 20 provides to the IPTV client 21, requests that the IPTV client 21, rather than the IPTV server 20, transmit the information and receives the information in response to the request.

The IPTV server 20 transmits the information to only the IPTV client 21, and the IPTV client 21 receiving the information shares the information with the IPTV client 22 in the subnet, thereby preventing overload of the IPTV server 20.

Figure 3:
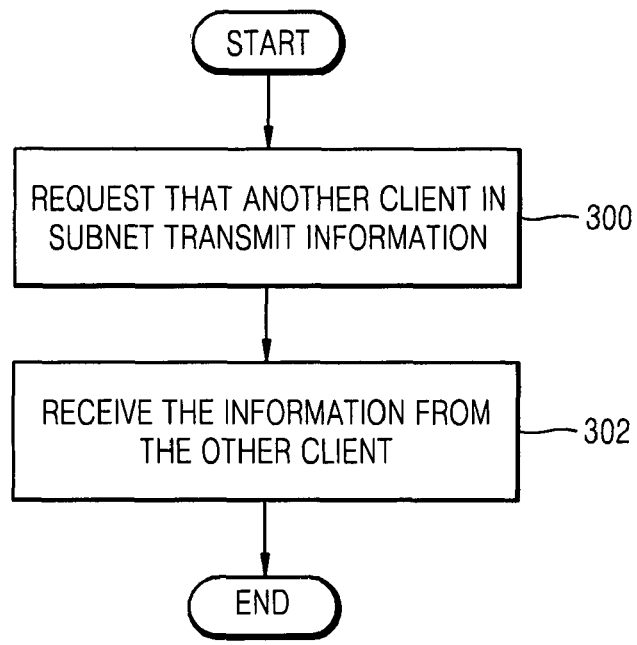
FIG. 3 is a flowchart of a method of allowing an IPTV client to transmit and receive information according to an exemplary embodiment of the present invention.

FIG. 3 is a flowchart of a method of allowing the IPTV client 22 to receive information, according to an exemplary embodiment of the present invention.

In operation 300, the IPTV client 22 requests that another IPTV client, e.g., the IPTV client 21, in the subnet transmit the information.

Here, the information may include information regarding content (EPG information, ECG information, thumbnail information, URL information and metadata information regarding content that the IPTV server 20 holds), and information related to services of the IPTV server (weather information, stock information, cultural information, etc.). Also, the information may include information (skin images, binary files, etc.) for upgrading a program for an IPTV client.

In operation 300, a request message requesting transmission of the information is preferably multicast or broadcast to IPTV clients in the subnet so as to request transmission of the information. A network managed by the same router allows multicasting or broadcasting between clients, and therefore, the request message may be multicast or broadcast so as to request transmission of the information.

The request message may contain identification information of the IPTV client 22 that transmits the request message. In order to allow the IPTV client 21 to transmit the information, it is necessary to identify the IPTV client 22 that transmits the request message. Therefore, the identification information is included in the request message that is to be transmitted.

The identification information may include information, such as an IP address and a media access control (MAC) address, which is used to identify clients in the same network.

In operation 302, the IPTV client 22 receives the information that the IPTV client 21 transmitted in response to the request made in operation 300. That is, the IPTV client 22 receives the information that the IPTV client 21 belonging to the same subnet transmitted in response to the request made in operation 300.

The request made in operation 300 may be transmitted via multicast or broadcast, but the information in operation 302 is received via unicast. Since the identification information of the IPTV client 22 is included in the request message in operation 300, the IPTV client 22 receives the information that is unicast, based on the identification information.

Figure 4:
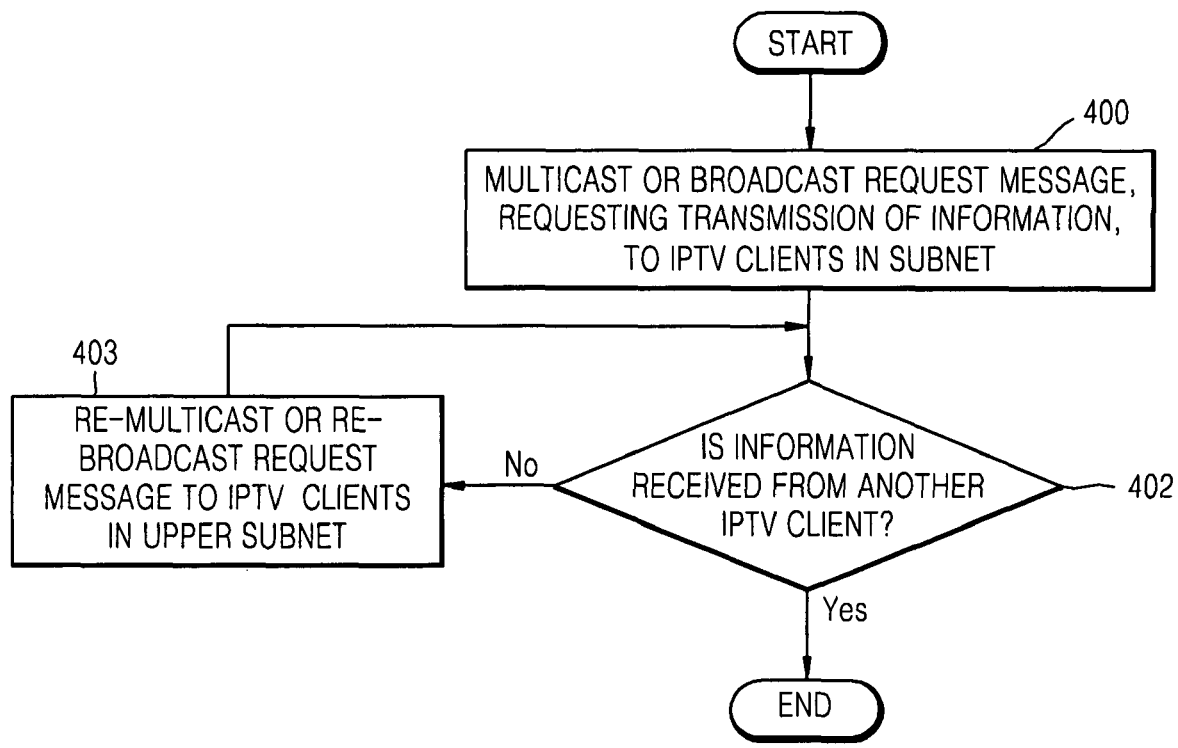
FIG. 4 is a flowchart of a method of allowing an IPTV client to transmit and receive information according to another exemplary embodiment of the present invention.

FIG. 4 is a flowchart of a method of allowing the IPTV client 22 to receive information, according to another exemplary embodiment of the present invention.

In operation 400, the IPTV client 22 multicasts or broadcasts a request message, requesting information, to another IPTV client, e.g., the IPTV client 21, which belongs to the same subnet. The IPTV client 22 preferably inserts its identification information into the request message and multicasts or broadcasts the request message to the IPTV client 21.

In operation 402, the IPTV client 22 determines whether it has received the information in response to the request message in operation 400. If the IPTV client 22 has received the information, the method of FIG. 4 is terminated. However, IPTV clients receiving the request message may not have the information that the IPTV client 21 desires to receive, and in this case, no response will be made to the request message. If the IPTV client 22 does not receive the information in response to the request message, the IPTV client 22 performs operation 403.

In operation 403, the IPTV client 22 re-multicasts or re-broadcasts the request message to an upper subnet of a subnet in which the IPTV client 22 originally multicast or broadcast the request message in operation 400. The method of FIG. 4 will be described with reference to FIG. 5 in detail.

Figure 5:
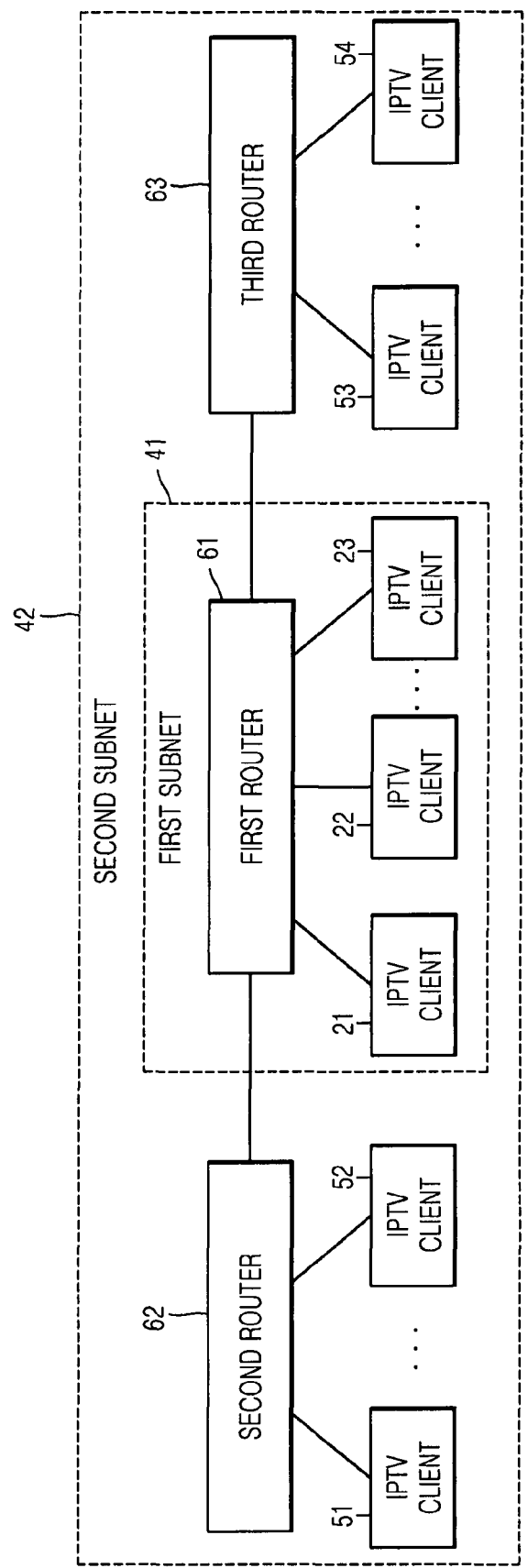
FIG. 5 is a block diagram illustrating a method of changing the range of a network via which a request message is transmitted, according to an exemplary embodiment of the present invention.

FIG. 5 is block diagram illustrating a method of changing the range of a network via which a request message is transmitted, according to an exemplary embodiment of the present invention. Referring to FIG. 5, it is assumed that the IPTV clients 21 through 23 belong to a first subnet 41 managed by a first router 61.

In operation 400, the IPTV client 22 first multicasts or broadcasts a request message, requesting information, to the IPTV clients 21 and 23 belonging to the first subnet 41 managed by the first router 61.

If it is determined in operation 402 that there is no response from other IPTV clients 21 and 23 receiving the request message, the IPTV client 22 re-multicasts or re-broadcasts the request message in operation 403. In this case, the request message is transmitted by increasing the range of the subnet via which the request message is transmitted.

In other words, the request message is also multicast or broadcast to IPTV clients 51 through 54 belonging to a second subnet 42. That is, the request message is transmitted to the IPTV clients 51 and 52 managed by a second router 62 adjacent to the first router 61, and the IPTV clients 53 and 54 managed by a third router 63 that is also adjacent to the first router 61.

The IPTV client 22 may change the range of the subnet by changing the setting of a packet time-to-live (TTL) of the request message that is to be transmitted. The packet TTL is reduced by 1 whenever a router is passed through. Thus, in operation 400, the packet TTL is set to 1 so that the request message can be transmitted to only the IPTV clients 21 through 23 belonging to the first subnet. Next, in operation 403, the packet TTL is set to 2 so that the request message can be transmitted to the IPTV clients 21 through 23 and 51 through 54.

The method using the packet TTL, which is illustrated in FIG. 5, is just an example of a method of changing the range within which the request message is multicast or broadcast. It would be apparent to those of ordinary skill in the art that various methods of changing the range of the network can be applied to the present invention.

Figure 6:
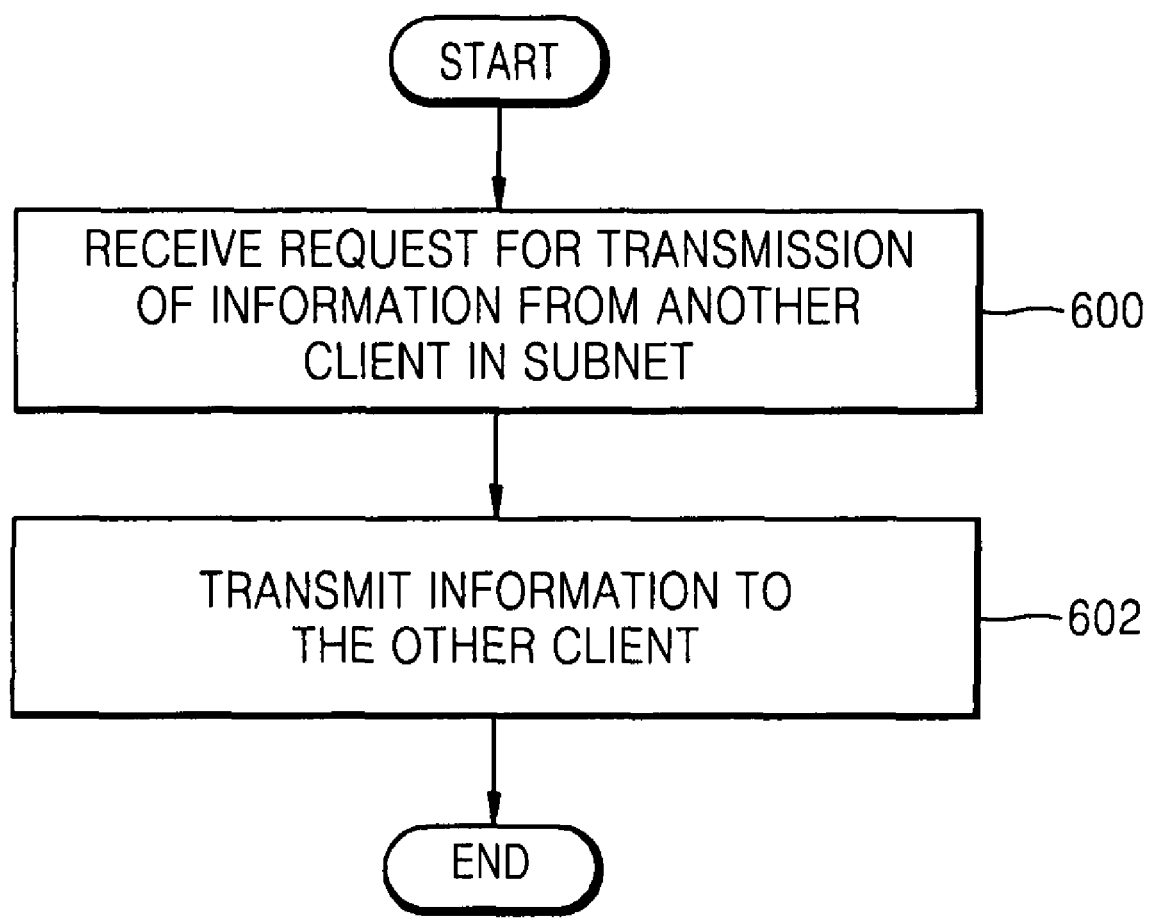
FIG. 6 is a flowchart of a method of allowing a client to share information received from a server, according to an exemplary embodiment of the present invention.

FIG. 6 is a flowchart of a method of allowing the IPTV client 21 to share information received from a server, according to an exemplary embodiment of the present invention. Referring to FIG. 6, in operation 600, the IPTV client 21 receiving the information from the server receives a request for transmission of the information from another IPTV client belonging to the same subnet.

The IPTV client 21 preferably receives a request message requesting transmission of the information, the request message being multicast or broadcast by another IPTV client belonging to the same subnet. The request message may contain the identification information of the other IPTV client, e.g., the IPTV client 22. The identification information may contain an IP address, an MAC address, etc., as described above.

In operation 602, the IPTV client 21 transmits the information to the IPTV client 22 requesting the information in operation 600. The request message received in operation 600 contains the identification information of the IPTV client 22, and thus, the IPTV client 21 transmits the information to the IPTV client 22 based on the identification information.

In another exemplary embodiment of the present invention, if the information is allowed to be transmitted to only the IPTV client 21, the IPTV client 21 may refuse to transmit the information and report this fact to the IPTV client 22. For example, when the information that the IPTV client 22 requests is information incurring a charge, sharing of the information is limited, and therefore, the information may be allowed to be transmitted to only the IPTV client 21.

Figure 7:
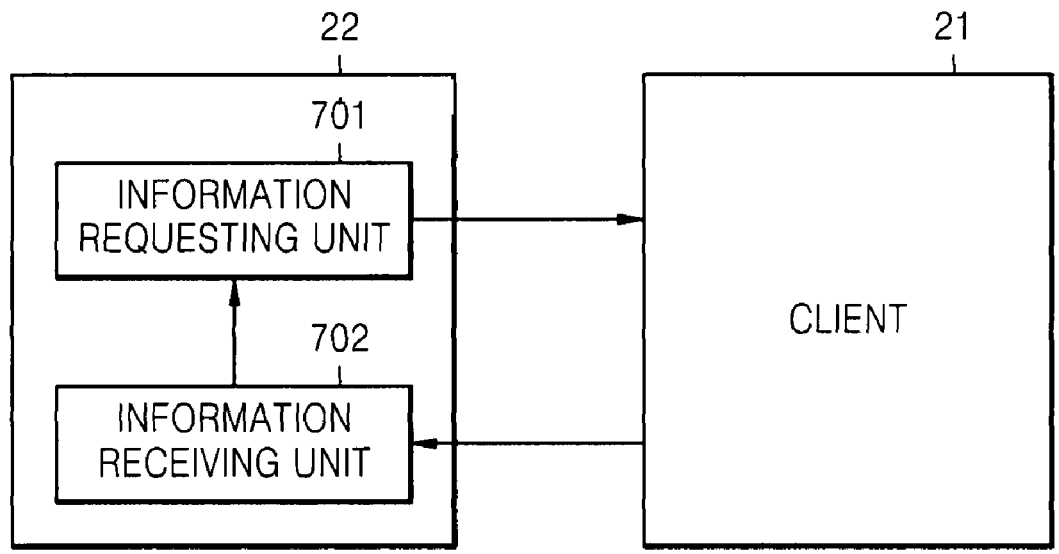
FIG. 7 is a block diagram of an apparatus that is included in an IPTV client in order to receive information, according to an exemplary embodiment of the present invention.

FIG. 7 is a block diagram of an apparatus that is included in the IPTV client 22 so as to receive information, according to an exemplary embodiment of the present invention. Referring to FIG. 7, the apparatus includes an information requesting unit 701 and an information receiving unit 702.

The information requesting unit 701 requests that another IPTV client, e.g., the IPTV client 21, in a subnet to which the IPTV client 22 belongs, transmit information. The information, which is received from the IPTV server 20 by the IPTV client 21, is information regarding a service and/or content provided by the IPTV server 20.

The information requesting unit 701 preferably multicasts or broadcasts a request message requesting the information to IPTV clients in the subnet in order to request transmission of the information. In this case, the request message may contain the identification information of the IPTV client 22.

Also, if there is no response from the IPTV clients in the subnet after the transmission of the request message, it is possible to re-multicast or re-broadcast the request message to IPTV clients in a subnet having a larger range than that of the original subnet.

The information receiving unit 702 receives the information that the IPTV client 21 transmits in response to the request for the information from the information requesting unit 701. If the information receiving unit 702 does not receive the information in response to the request message transmitted by the information requesting unit 701, the information receiving unit 702 preferably transmits a control signal to the information requesting unit 701 so that the information requesting unit 701 transmits the request message to IPTV clients belonging to a subnet having a larger range than that of the original subnet.

Figure 8:
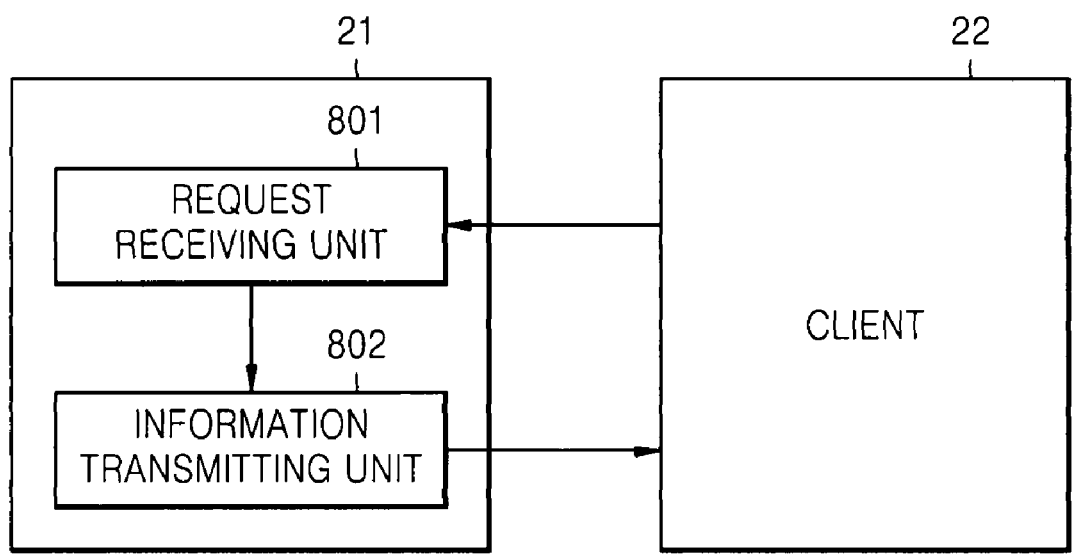
FIG. 8 is a block diagram of an apparatus that is included in an IPTV client in order to share information received from an IPTV server, according to an exemplary embodiment of the present invention.

FIG. 8 is a block diagram of an apparatus that is included in the IPTV client 21 in order to share information received from an IPTV server, according to an exemplary embodiment of the present invention. Referring to FIG. 8, the apparatus includes a request receiving unit 802 and an information transmitting unit 801

The request receiving unit 802 receives a request for information from another IPTV client (the IPTV client 22) in a subnet to which the IPTV client 21 belongs. The request receiving unit 802 preferably receives a request message requesting the information, the request message being multicast or broadcast by the IPTV client 22. The request message may contain the identification information of the IPTV client 22.

The information transmitting unit 801 transmits the information to the IPTV client 22 since the request receiving unit 802 receives the request for the information. The request message transmitted by the IPTV client 22 contains the identification information of the IPTV client 22, and thus, the information transmitting unit 801 transmits the information to the IPTV client 22 based on the identification information.

A system according to the present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

According to the present invention, information regarding content and/or a service that a server provides can be shared between clients without the server's intervention, and thus, the server need not make individual responses to requests from a large number of clients, thereby preventing overload of the server.

Further, since information can be shared quickly between clients that are physically and temporally adjacent to each other, it is possible to efficiently transmit and receive the information.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of allowing a first client to receive information from a server, the method comprising:
   requesting, by the first client, that a second client in a subnet to which the first client belongs transmit the information; and
   receiving, by the first client, the information that the second client transmits in response to the request,
   wherein the requesting comprises:
      multicasting or broadcasting, by the first client, a request message, requesting transmission of the information, to a plurality of clients in the subnet to which the first client belongs, and
      if a response to the request message is not received within a predetermined amount of time, re-multicasting or re-broadcasting, by the first client, the request message to a plurality of clients in an upper subnet which includes the subnet by changing a setting of a packet time-to-live (TTL) of the request message.

2. The method of claim 1, wherein the first client and the server are an Internet Protocol Television (IPTV) client and an IPTV server, respectively, and the information comprises at least one of electronic program guide information and electronic cinema guide information regarding content that the server provides.

3. The method of claim 1, wherein the requesting comprises multicasting or broadcasting a request message, requesting transmission of the information, to a plurality of clients in the subnet to which the first client belongs.

4. The method of claim 3, wherein the request message comprises identification information of the first client.

5. The method of claim 4, wherein the identification information comprises at least one of an Internet Protocol (IP) address and a media access control (MAC) address of the first client.

6. A method of allowing a first client to share information received from a server, the method comprising:
   receiving, by the first client, a request for the information from a second client in a first subnet to which the first client belongs; and
   transmitting, by the first client, the information to the second client in response to the request,
   wherein the second client multicasts or broadcasts a request message, requesting transmission of the information, to a plurality of clients in the first subnet to which the first client belongs, and if a response to the request message is not received within a predetermined amount of time, re-multicasts or re-broadcasts the request message to a plurality of clients in a second subnet which includes the first subnet by changing a setting of a packet time-to-live (TTL) of the request message.

7. The method of claim 6, wherein the first client and the server are an Internet Protocol Television (IPTV) client and an IPTV server, respectively, and
   the information comprises at least one of electronic program guide information and electronic cinema guide information regarding content that the server provides.

8. The method of claim 6, wherein the receiving the request comprises receiving a request message requesting transmission of the information, where the second client multicasts or broadcasts the request message to a plurality of clients in the subnet.

9. The method of claim 8, wherein the request message comprises identification information of the second client.

10. The method of claim 9, wherein the identification information comprises at least one of an Internet Protocol (IP) address and a media access control (MAC) address of the second client.

11. An apparatus which is included in a first client so as to receive information from a server, the apparatus comprising:
   an information requesting unit which requests that a second client in a subnet to which the first client belongs transmit the information stored in the second client; and
   an information receiving unit which receives the information that the second client transmits in response to the request,
   wherein the information requesting unit multicasts or broadcasts a request message, requesting transmission of the information, to a plurality of clients in the subnet to which the first client belongs, and re-multicasts or re-broadcasts the request message to a plurality of clients in an upper subnet which includes the subnet by changing a setting of a packet time-to-live (TTL) of the request message if a response the request message is not received within a predetermined amount of time.

12. The apparatus of claim 11, wherein the first client and the server are an Internet Protocol Television (IPTV) client and an IPTV server, respectively, and
   the information comprises at least one of electronic program guide information and electronic cinema guide information regarding content that the server provides.

13. The apparatus of claim 11, wherein the information requesting unit multicasts or broadcasts a request message, requesting transmission of the information, to a plurality of clients in the subnet to which the first client belongs.

14. An apparatus which is included in a first client so as to allow the first client to share information received from a server, the apparatus comprising:
   a request receiving unit which receives a request for transmission of the information from a second client in a first subnet to which the first client belongs; and an information transmitting unit which transmits the information to the second client in response to the request, wherein the second client multicasts or broadcasts a request message, requesting transmission of the information, to a plurality of clients in the first subnet to which the first client belongs, and if a response to the request message is not received within a predetermined amount of time, re-multicasts or re-broadcasts the request message to a plurality of clients in a second subnet which includes the first subnet by changing a setting of a packet time-to-live (TTL) of the request message.

15. The apparatus of claim 14, wherein the first client and the server are an Internet Protocol Television (IPTV) client and an IPTV server, respectively, and the information comprises at least one of electronic program guide information and electronic cinema guide information regarding content that the server provides.

16. The apparatus of claim 14, wherein the request receiving unit receives a request message, requesting transmission of the information, that the second client multicasts or broadcasts to a plurality of clients in the subnet.

17. A non-transitory computer readable medium having recorded thereon a computer program for causing a computer executing the program to perform a method of allowing a first client to receive information from a server, the method comprising:

requesting, by the first client, that a second client in a subnet to which the first client belongs transmit the information; and receiving, by the first client, the information that the second client transmits in response to the request, wherein the requesting comprises:

multicasting or broadcasting, by the first client, a request message, requesting transmission of the information, to a plurality of clients in the subnet to which the first client belongs, and if a response to the request message is not received within a predetermined amount of time, re-multicasting or re-broadcasting, by the first client, the request message to a plurality of clients in an upper subnet which includes the subnet by changing a setting of a packet time-to-live (TTL) of the request message.

18. A non-transitory computer readable medium having recorded thereon a computer program for causing a computer executing the program to perform a method of allowing a first client to share information received from a server, the method comprising:

receiving, by the first client, a request for the information from a second client in a first subnet to which the first client belongs; and transmitting, by the first client, the information to the second client in response to the request, wherein the second client multicasts or broadcasts a request message, requesting transmission of the information, to a plurality of clients in the first subnet to which the first client belongs, and if a response to the request message is not received within a predetermined amount of time, re-multicasts or re-broadcasts the request message to a plurality of clients in a second subnet which includes the first subnet by changing a setting of a packet time-to-live (TTL) of the request message.

19. The method of claim 1, wherein the first client and the second client are clients of the server.

20. The method of claim 1, wherein:

the first client performs a plurality of operations using the information; and the second client performs at least a plurality of the operations performed by the first client using the information.

21. The method of claim 1, wherein the second client received the information from the server prior to receiving the request from the first client.

22. The method of claim 1, wherein the second client obtains the information for use by the second client without regard to whether a request is received from the first client.

23. The method of claim 6, wherein the first client and the second client are clients of the server.

24. The method of claim 6, wherein:

the first client performs a plurality of operations using the information; and the second client performs at least a plurality of the operations performed by the first client using the information.

25. The method of claim 6, wherein the first client received the information from the server prior to receiving the request from the second client.

26. The method of claim 6, wherein the first client obtains the information for use by the second client without regard to whether a request is received from the second client.

27. The method of claim 1, wherein the re-multicasting or the re-broadcasting comprises, in response to the response to the request message not being received within the predetermined amount of time, re-multicasting or re-broadcasting, by the first client, the request message to the plurality of clients in the upper subnet which includes the subnet by increasing the packet TTL of the request message.

* * * * *